(12) United States Patent
Van Vactor et al.

(10) Patent No.: US 8,224,552 B2
(45) Date of Patent: Jul. 17, 2012

(54) METHODS AND SYSTEMS TO FACILITATE OVER-SPEED PROTECTION

(75) Inventors: David R. Van Vactor, Liberty Township, OH (US); Steven E. Nolte, Harrison, OH (US); Bertram S. Noyes, Jr., Newbury, MA (US)

(73) Assignee: General Electric Company, Schenectady, NY (US)

( * ) Notice: Subject to any disclaimer, the term of this patent is extended or adjusted under 35 U.S.C. 154(b) by 956 days.

(21) Appl. No.: 12/171,142

(22) Filed: Jul. 10, 2008

(65) Prior Publication Data
US 2010/0010721 A1  Jan. 14, 2010

(51) Int. Cl.
F02D 45/00 (2006.01)
(52) U.S. Cl. .......... 701/100; 60/773; 60/39.281; 60/204
(58) Field of Classification Search ............... 73/112.01; 700/90, 286–290; 701/93–112, 123
See application file for complete search history.

(56) References Cited

U.S. PATENT DOCUMENTS

| 3,939,328 | A |   | 2/1976  | Davis          |         |
|-----------|---|---|---------|----------------|---------|
| 3,998,047 | A |   | 12/1976 | Walker         |         |
| 4,038,817 | A | * | 8/1977  | Snow et al.    | 60/204  |
| 4,044,554 | A |   | 8/1977  | West           |         |
| 4,051,669 | A |   | 10/1977 | Yannone et al. |         |
| 4,275,558 | A |   | 6/1981  | Hatch et al.   |         |
| 4,327,294 | A |   | 4/1982  | Smith et al.   |         |
| 4,423,592 | A |   | 1/1984  | Evans          |         |
| 4,528,812 | A |   | 7/1985  | Cantwell       |         |
| 4,651,518 | A |   | 3/1987  | McLaughlin et al. |      |
| 4,712,372 | A |   | 12/1987 | Dickey et al.  |         |
| 4,716,531 | A | * | 12/1987 | Saunders et al. | 701/100 |
| 4,718,229 | A |   | 1/1988  | Riley          |         |
| 4,837,697 | A |   | 6/1989  | Eisa et al.    |         |

(Continued)

FOREIGN PATENT DOCUMENTS

EP            1296045 A2    3/2003

(Continued)

OTHER PUBLICATIONS

A Search Report under Section 17, Intellectual Property Office, London, England, for copending GB application No. GB0907939.3 (3 pages).

(Continued)

*Primary Examiner* — Thomas Black
*Assistant Examiner* — Wae Louie
(74) *Attorney, Agent, or Firm* — David J. Clement, Esq.; Armstrong Teasdale LLP

(57) ABSTRACT

A method for assembling a gas turbine engine is described. The method includes coupling a first fuel system interface (FSI-1) to a second fuel system interface (FSI-2), and coupling one of the FSI-1 and the FSI-2 to the engine. The method includes coupling a first control system and a second control system to the FSI-1 and to the FSI-2. The first control system includes a first driver A and a second driver A, and the second control system includes a first driver B and a second driver B. The method includes configuring the first control system and the second control system to apply a first over-speed logic algorithm and a second over-speed logic algorithm to determine operation of the first driver A, the second driver A, the first driver B, and the second driver B.

23 Claims, 5 Drawing Sheets

U.S. PATENT DOCUMENTS

| | | | |
|---|---|---|---|
| 4,987,737 A | 1/1991 | Cantwell | |
| 4,998,949 A | 3/1991 | Cantwell | |
| 5,003,769 A | 4/1991 | Cantwell | |
| 5,051,918 A | 9/1991 | Parsons | |
| 5,083,277 A | 1/1992 | Shutler | |
| 5,134,845 A | 8/1992 | Romano | |
| 5,189,620 A | 2/1993 | Parsons et al. | |
| 5,259,188 A | 11/1993 | Baxter et al. | |
| 5,303,545 A | 4/1994 | Larkin | |
| 5,305,595 A | 4/1994 | Curran et al. | |
| 5,313,778 A | 5/1994 | Sweet et al. | |
| 5,337,982 A | 8/1994 | Sherry | |
| 5,452,200 A | 9/1995 | Barry | |
| 5,524,599 A | 6/1996 | Kong et al. | |
| 5,622,045 A | 4/1997 | Weimer et al. | |
| 5,752,379 A | 5/1998 | Schafer et al. | |
| 5,806,052 A | 9/1998 | Bonissone et al. | |
| 6,059,522 A | 5/2000 | Gertz et al. | |
| 6,119,446 A | 9/2000 | Shon | |
| 6,176,074 B1 | 1/2001 | Thompson et al. | |
| 6,199,362 B1 | 3/2001 | Hepner | |
| 6,289,274 B1 | 9/2001 | Martucci et al. | |
| 6,321,525 B1 | 11/2001 | Rogers | |
| 6,353,790 B1 | 3/2002 | Tsuzuki | |
| 6,401,446 B1 | 6/2002 | Gibbons | |
| 6,434,473 B1 | 8/2002 | Hattori | |
| 6,487,096 B1 | 11/2002 | Gilbreth et al. | |
| 6,578,794 B1 | 6/2003 | Clark et al. | |
| 6,619,027 B1 | 9/2003 | Busch | |
| 6,651,442 B2 | 11/2003 | Davies et al. | |
| 6,718,767 B1 | 4/2004 | Caddy | |
| 6,823,675 B2 | 11/2004 | Brunell et al. | |
| 6,898,512 B1 | 5/2005 | Ritter et al. | |
| 6,898,939 B2 * | 5/2005 | Busch | 60/773 |
| 6,915,639 B1 * | 7/2005 | Linebrink | 60/776 |
| 6,996,970 B2 | 2/2006 | Lorenz | |
| 7,003,939 B1 | 2/2006 | Rackwitz et al. | |
| 7,003,940 B2 | 2/2006 | Groppi et al. | |
| 7,337,020 B2 | 2/2008 | Orth | |
| 7,347,050 B2 | 3/2008 | Gainford | |
| 7,571,045 B2 | 8/2009 | Muramatsu et al. | |
| 7,587,900 B2 * | 9/2009 | Shelby et al. | 60/773 |
| 7,840,336 B2 | 11/2010 | Muramatsu et al. | |
| 7,845,177 B2 | 12/2010 | Parsons | |
| 8,036,805 B2 | 10/2011 | Mahoney et al. | |
| 2002/0104308 A1 | 8/2002 | Dudd et al. | |
| 2002/0166324 A1 | 11/2002 | Willis et al. | |
| 2004/0103669 A1 | 6/2004 | Willis et al. | |
| 2004/0117102 A1 * | 6/2004 | Weir et al. | 701/100 |
| 2005/0103931 A1 | 5/2005 | Morris et al. | |
| 2005/0144957 A1 * | 7/2005 | Ackerman et al. | 60/773 |
| 2005/0217274 A1 | 10/2005 | Muramatsu et al. | |
| 2006/0174628 A1 | 8/2006 | Mikhail | |
| 2006/0288703 A1 | 12/2006 | Kurtz et al. | |
| 2010/0000222 A1 | 1/2010 | Price et al. | |
| 2010/0010720 A1 * | 1/2010 | Van Vactor et al. | 701/100 |
| 2010/0010721 A1 * | 1/2010 | Van Vactor et al. | 701/100 |

FOREIGN PATENT DOCUMENTS

| | | |
|---|---|---|
| GB | 1411814 A | 10/1975 |
| GB | 2355081 A | 4/2001 |
| GB | 2427711 A | 1/2007 |
| JP | 3085917 B2 | 9/2000 |

OTHER PUBLICATIONS

A Search Report Under Section 17(5) from the Intellectual Property Office, London, England, dated Sep. 3, 2009 (3 pages).

Final Office Action U.S. Appl. No. 12/170,932, filed Jul. 10, 2008, 13 pages.

* cited by examiner

| FUEL METERING VALVES ALLOWING FUEL FLOW TO COMBUSTOR? | FIRST FUEL SYSTEM INTERFACE DETERMINES OVERSPEED CONDITION? | SECOND FUEL SYSTEM INTERFACE DETERMINES OVERSPEED CONDITION? | ENGINE FUEL FLOW? |
|---|---|---|---|
| YES | NO | NO | YES |
| YES | NO | YES | YES |
| YES | YES | NO | YES |
| YES | NO | YES | NO |
| NO | NO | NO | NO |
| NO | YES | NO | NO |
| NO | YES | YES | NO |

FIG. 3

METHODS AND SYSTEMS TO FACILITATE OVER-SPEED PROTECTION

STATEMENT REGARDING FEDERALLY SPONSORED RESEARCH & DEVELOPMENT

The U.S. Government may have certain rights in this invention as provided for by the terms of Contract No. N00019-04-C-0093.

BACKGROUND OF THE INVENTION

The field of the disclosure relates generally to gas turbine engine rotors and, more particularly, to fuel system interfaces used to prevent rotor over-speed conditions.

Gas turbine engines typically include over-speed protection systems that provide rotor over-speed protection. In known systems, the over-speed protection systems either maintains the rotor speed below critical rotor speeds, or shuts off fuel flow to an engine combustor. One type of known protection system receives signals, indicative of rotor speed, from mechanical speed sensors. The mechanical speed sensors include rotating flyweight sensing systems that indicate an over-speed condition as a result of the rotor rotating above the normal operational maximum speeds. The flyweight sensing systems are hydro-mechanically coupled to a fuel bypass valve that reduces an amount of fuel that can be supplied to the engine if an over-speed condition is sensed.

Other types of known over-speed protection systems receive over-speed signal information from electronic control sensors. Known electronic controls derive over-speed conditions from such electronic control sensors. Such systems provide for rapid fuel shutoff and engine shutdown if engine speed exceeds a normal maximum value.

In some known aircraft, propulsion systems are used to control a flow of exhaust gases for a variety of aircraft functions. For example, such systems can be used to provide thrust for Vertical Take-Off and Landing (VTOL), Short Take-Off Vertical Landing (STOVL) and/or Extreme Short Take-Off and Landing (ESTOL) aircraft. At least some known STOVLs and ESTOLs use vertical thrust posts that facilitate short, and extremely short, take-offs and landings. In aircraft using vertical thrust posts or nozzles, exhaust from a common plenum is channeled to thrust posts during take-off and landing operations, and, at a predetermined altitude, the exhaust is channeled from the common plenum through a series of valves, to a cruise nozzle.

At least some known gas turbine engines include combustion control systems that include symmetric channels for providing electric signals to the control system. However, such channels may allow common design deficiencies in each channel to cause transients during operation of the control system and/or gas turbine engine. For example, at least one such known combustion control system is an over-speed system that protects an airframe and/or a pilot from turbine and/or compressor wheel transients caused by a rotational speed over the design limits of a turbine and/or a compressor. More specifically, when the rotational speed is over a design limit, the over-speed system will shut down the gas turbine engine by preventing fuel from flowing to the engine. As such, the over-speed system can prevent turbine and/or compressor wheel transients from occurring.

However, if the circuitry within full authority digital engine controls (FADECs) that control such an over-speed system have a common design deficiency, both channels of the FADECs may inadvertently command the over-speed system to prevent fuel from flowing to the engine, even though a rotational speed in excess of a design limit has not been reached, causing an unexpected engine shut down. Accordingly, it is desirable to have a combustion control system that will not inadvertently shut down a gas turbine engine when operating conditions are within design limits.

BRIEF DESCRIPTION OF THE INVENTION

In one aspect, a method for assembling a gas turbine engine is provided. The method includes coupling a first fuel system interface (FSI-1) to a second fuel system interface (FSI-2) and coupling one of the FSI-1 and the FSI-2 to the gas turbine engine. The method also includes coupling a first control system to the FSI-1 and to the FSI-2, and coupling a second control system to the FSI-1 and to the FSI-2. The first control system includes a first driver A and a second driver A and the second control system includes a first driver B and a second driver B. The method also includes configuring the first control system to apply a first over-speed logic algorithm to determine operation of at least one of first driver A, second driver A, first driver B, and second driver B, and to apply a second over-speed logic algorithm to determine operation of at least one of first driver A, second driver A, first driver B, and second driver B. The method also includes configuring the second control system to apply the first over-speed logic algorithm to determine operation of at least one of first driver A, second driver A, first driver B, and second driver B, and to apply the second over-speed logic algorithm to determine operation of at least one of first driver A, second driver A, first driver B, and second driver B.

In another aspect, an over-speed protection system for a gas turbine engine including a rotor is provided. The over-speed protection system includes a fuel throttling/shutoff valve coupled to a fuel supply coupled to the gas turbine engine, a first fuel system interface (FSI-1) coupled to the fuel throttling/shutoff valve, and a second fuel system interface (FSI-2) coupled to the FSI-1. The system also includes a first control system coupled to the FSI-1 and to the FSI-2. The first control system includes a first driver A and a second driver A and is programmed with a first logic algorithm and a second logic algorithm. The system also includes a second control system coupled to the FSI-1 and the FSI-2. The second control system includes a first driver B and a second driver B and is programmed with the first logic algorithm and the second logic algorithm.

In yet another aspect, a gas turbine engine is provided. The gas turbine engine includes a rotor, a fuel delivery system configured to supply fuel to the engine for operating the rotor, and an over-speed protection system coupled to the fuel delivery system. The over-speed protection system includes a fuel throttling/shutoff valve coupled to the fuel delivery system, a first fuel system interface (FSI-1) coupled to the fuel throttling/shutoff valve, and a second fuel system interface (FSI-2) coupled to the FSI-1. The over-speed protection system also includes a first control system coupled to the FSI-1 and to the FSI-2. The first control system includes a first driver A and a second driver A and is programmed with a first logic algorithm and a second logic algorithm. The over-speed protection system also includes a second control system coupled to the FSI-1 and the FSI-2. The second control system includes a first driver B and a second driver B and is programmed with the first logic algorithm and the second logic algorithm.

Accordingly, the embodiments described herein facilitate preventing inadvertent gas turbine engine shut down by including the above-described features.

BRIEF DESCRIPTION OF THE DRAWINGS

FIG. 3 is a priority logic table that may be used with the rotor over-speed protection system shown in FIG. 2.

DETAILED DESCRIPTION OF THE INVENTION

Identifying and preventing rotor over-speed conditions is critical due to damage that may occur to an engine should a rotor speed exceed a maximum speed. It is also desirable to minimize false determinations of over-speed conditions. Minimizing false determinations of over-speed conditions is especially important in single-engine aircraft, where determination and action to facilitate prevention of a rotor over-speed condition may lead to the loss of an aircraft.

Accordingly, it is desirable to have a rotor over-speed protection system that does not allow common design deficiencies in each symmetric channel to cause transients during operation of a control system and/or a gas turbine engine. For example, in one embodiment, the over-speed protection system includes multiple differing fuel system interfaces, and as such, does not include common design deficiencies. In another example, an over-speed protection system includes a control system that has asymmetric driver circuits. The embodiments described herein include two different driver circuits and, more particularly, a torque motor driver circuit and a solenoid driver circuit used for controlling combustion within a gas turbine engine. In yet another example, an over-speed protection system includes a control system that includes a plurality of independent logic algorithms.

Figure 1:
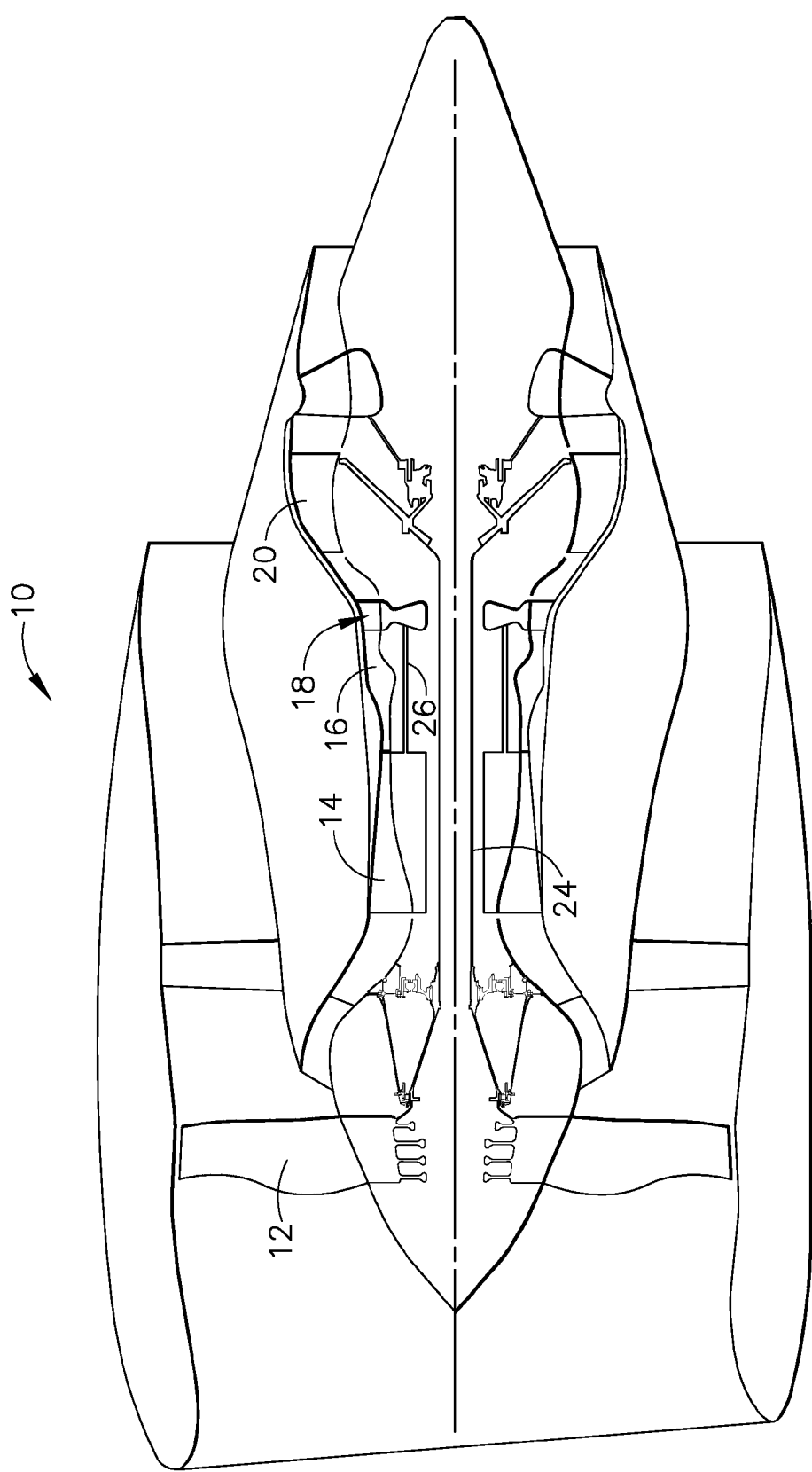
FIG. 1 is a schematic illustration of an exemplary gas turbine engine.

FIG. 1 is a schematic illustration of an exemplary gas turbine engine 10 that includes a low pressure compressor 12, a high pressure compressor 14, and a combustor 16. Engine 10 also includes a high pressure turbine 18, and a low pressure turbine 20. Compressor 12 and turbine 20 are coupled by a first rotor shaft 24, and compressor 14 and turbine 18 are coupled by a second rotor shaft 26. In operation, air flows through low pressure compressor 12 and compressed air is supplied from low pressure compressor 12 to high pressure compressor 14. Compressed air is then delivered to combustor 16 and airflow from combustor 16 drives turbines 18 and 20.

Figure 2:
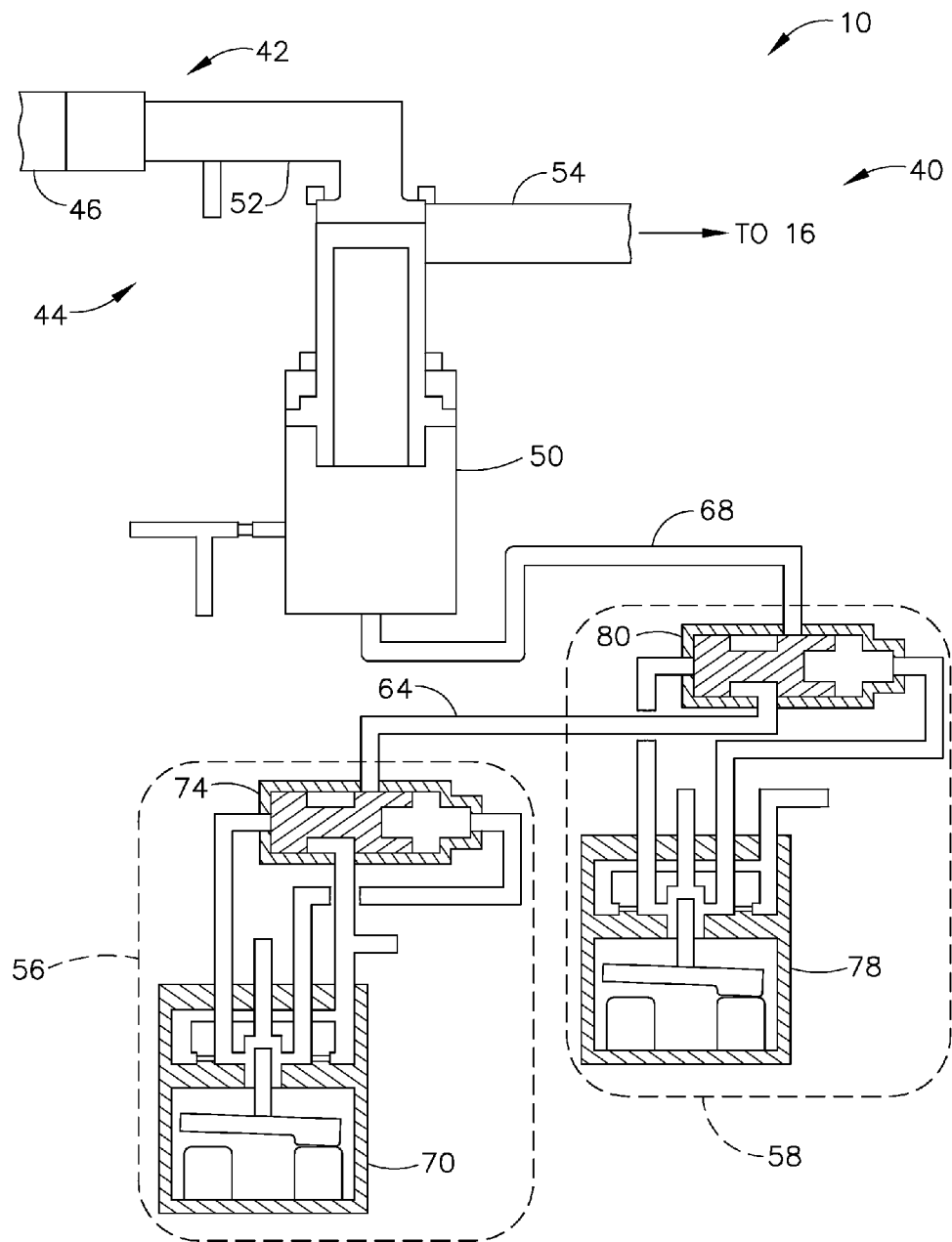
FIG. 2 is a schematic illustration of an exemplary rotor over-speed protection system that may be used with the gas turbine engine shown in FIG. 1.

FIG. 2 is a schematic illustration of an exemplary rotor over-speed protection system 40 for use with example, engine 10, for example. In the exemplary embodiment, engine 10 includes a fuel metering system 42 that is in flow communication with a fuel delivery system 44. Fuel metering system 42 includes a fuel metering valve 46 and a fuel throttling/shutoff valve 50. Fuel delivery system 44 supplies fuel to engine 10 through fuel metering system 42, which controls a flow of fuel to engine 10. Fuel throttling/shutoff valve 50 is downstream from fuel metering valve 46 and receives fuel flow from fuel metering valve 46. In one embodiment, fuel throttling/shutoff valve 50 is a pressurizing shutoff valve.

In the exemplary embodiment, fuel throttling/shutoff valve 50 is coupled downstream from fuel metering valve 46 and in flow communication with fuel delivery system 44. Fuel throttling/shutoff valve 50 is coupled to fuel metering valve 46 by a fuel line 52. A separate fuel line 54 couples throttling/shutoff valve 50 to combustor 16 to enable fuel throttling/shutoff valve 50 to modulate and to control a flow of fuel to combustor 16 based on a pressure of the fuel received by fuel throttling/shutoff valve 50 and a desired discharge pressure. The throttling/shutoff valve 50 operates in conjunction with fuel metering valve 46 to facilitate metered fuel flow during nominal operation. The throttling function of valve 50 responds to fuel metering valve 46 to maintain a constant pressure drop across fuel metering valve 46 and deliver a fuel flow to combustor 16 that is proportional to an orifice area of fuel metering valve 46.

During operation, rotor over-speed protection system 40 facilitates preventing engine rotors, such as turbines 18 and 20 (shown in FIG. 1), from operating at a speed that is greater than a pre-set operational maximum speed, known as an over-speed condition. Additionally, system 40 facilitates preventing either engine rotors from accelerating to a speed that is greater than a pre-set operational maximum speed, known as an over-speed condition, when an engine independent speed sensing system (not shown in FIG. 2) determines normal engine operating limits have been exceeded. Moreover, system 40 facilitates preventing engine rotors from accelerating to a boost that is greater than a pre-set operational maximum boost, known as an over-boost condition, when an engine independent sensing system (not shown in FIG. 2) determines normal engine operating limits have been exceeded.

In the exemplary embodiment, rotor over-speed protection system 40 includes a first fuel system interface 56 and a second fuel system interface 58. Second fuel system interface 58 is coupled in series between throttling/shutoff valve 50 and first fuel system interface 56. Control lines 64 and 68 couple first fuel system interface 56 to second fuel system interface 58, and couple second fuel system interface 58 to throttling/shutoff valve 50, respectively. First fuel system interface 56 and second fuel system interface 58 provide a control pressure to throttling/shutoff valve 50. In the exemplary embodiment, first fuel system interface 56 includes an over-speed servovalve 70 and a shutoff shuttle valve 74. Moreover, in the exemplary embodiment, second fuel system interface 58 includes an over-speed servovalve 78 and a shutoff shuttle valve 80. In the exemplary embodiment, servovalves 70 and 78 are electro-hydraulic servovalves (EHSV). Alternatively, other types of servovalves may be used that enable rotor over-speed protection system 40 to function as described herein. For example, a solenoid, or combination of solenoid & EHSV, arranged in series, may be used to perform the function of the EHSV. Although described herein as an over-speed protection system, over-speed protection system 40 may also facilitate preventing over-boost conditions using the systems and methods described herein.

In the exemplary embodiment, rotor over-speed protection system 40 provides an independent and a secondary means of over-speed detection and fuel flow control to supplement the fuel flow control provided by fuel metering valve 46 and fuel throttling/shutoff valve 50. Servovalve 78 is coupled to at least one independent sensing system (shown in FIGS. 4 and 5) and as such, receives over-speed indications from at least one independent sensing system. Moreover, servovalve 70 is coupled to at least one independent sensing system and receives electrical over-speed indications from at least one independent sensing system.

FIG. 3 illustrates a priority logic table 90 of an exemplary relationship between fuel metering valve 46 and over-speed protection system 40. As described above, if fuel metering valve 46 determines a rotor over-speed condition has occurred, fuel metering valve 46 and fuel throttling/shutoff valve 50 prevent fuel flow to combustor 16. Table 90 illustrates that when fuel metering valve 46 and fuel throttling/shutoff valve 50 cease fuel flow to combustor 16, combustor 16 is not supplied fuel to prevent damage to engine 10. However, in the exemplary embodiment, as an additional layer of over-speed protection, fuel flow to combustor 16 may also be discontinued by throttling/shutoff valve 50 upon a determination of an over-speed condition by first fuel system interface 56 and second fuel system interface 58. This additional layer of over-speed protection may prevent an over-speed condition from damaging engine 10 in the event that fuel metering valve 46 becomes inoperable or malfunctions. For example, if a contaminant causes fuel metering valve 46 to remain in an "open" state (i.e., allowing fuel flow to combustor 16), even though valve 46 determines the occurrence of an over-speed condition, fuel system interfaces 56 and 58 detect the over-speed condition and prevent potential damage to engine 10.

As is shown in table 90, fuel flow is only discontinued when both fuel system interface 56 and fuel system interface 58 sense the occurrence of an over-speed condition. As described above, throttling/shutoff valve 50 controls a fuel pressure provided to combustor 16, and closes (i.e., discontinues fuel flow to combustor 16) when first fuel system interface 56 and second fuel system interface 58 sense an over-speed condition.

Priority logic table 90 illustrates the conditions under which engine fuel flow may be initiated in light of the various combinations of signals affecting fuel metering valve 46, fuel throttling/shutoff valve 50, over-speed protection system 40, and throttling/shutoff valve 50. More specifically, priority logic table 90 provides that when fuel throttling/shutoff valve 50 is activated, as a result of receipt of a signal indicating an over-speed condition, fuel flow can only be initiated when the over-speed signal is removed.

In the exemplary embodiment, servovalve 78 opens shuttle valve 80 upon receipt of a signal indicating the occurrence of an over-speed condition. Such a signal may be provided by a logic control system (shown in FIG. 5), described in more detail below. However, shuttle valve 80 alone will not cause throttling/shutoff valve 50 to discontinue fuel flow to combustor 16. Rather, servovalve 70 opens shuttle valve 74 upon receipt of a signal indicating the occurrence of an over-speed condition. Because first fuel system interface 56 and second fuel system interface 58 are coupled together in series, only when both shuttle valves 74 and 80 are open, will a control pressure be provided to throttling/shutoff valve 50 that causes throttling/shutoff valve 50 to close and discontinue fuel flow to combustor 16. By requiring an over-speed determination from both first fuel system interface 56 and second fuel system interface 58, the probability of a false determination of an over-speed condition is facilitated to be reduced. As such, undesirable and inadvertent engine shut downs based on false indications are also facilitated to be reduced.

Figure 4:
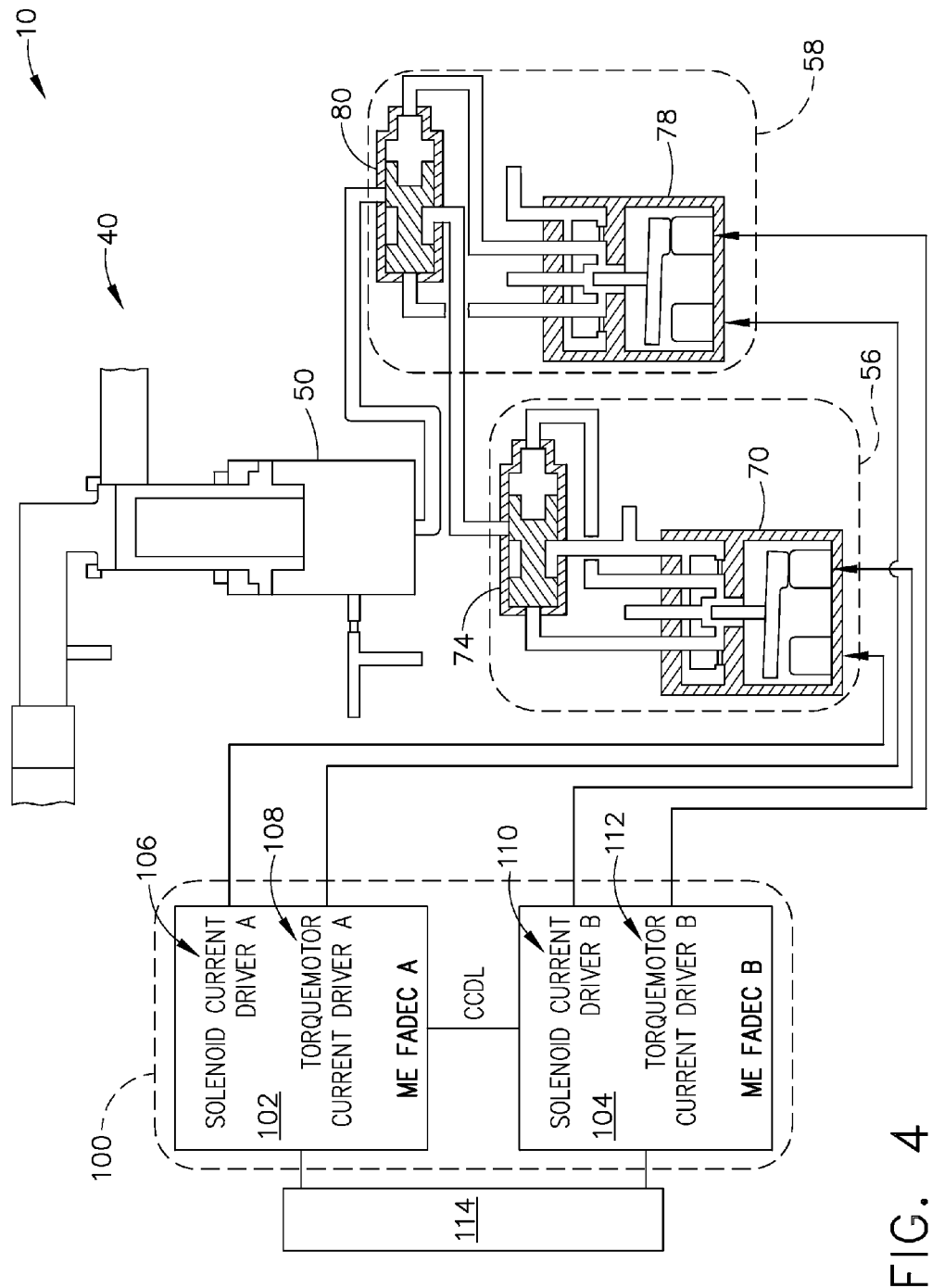
FIG. 4 is a schematic illustration of an exemplary control system coupled to the rotor over-speed protection system shown in FIG. 2.

FIG. 4 is a schematic illustration of an exemplary control system 100 coupled to rotor over-speed protection system 40. Alternatively, control system 100 may be integrated into over-speed protection system 40. In the exemplary embodiment, control system 100 includes a first driver control system 102 and a second driver control system 104. In the exemplary embodiment, first driver control system 102 and second driver control system 104 are full authority digital electronic controls (FADEC), which are commercially available from General Electric Aviation, Cincinnati, Ohio.

In the exemplary embodiment, first driver control system 102 includes a first driver A 106 and a second driver A 108. In an alternative embodiment, first driver control system 102 is coupled to first driver A 106 and second driver A 108. First driver control system 102 is programmed with software that includes a first logic algorithm and a second logic algorithm. In the exemplary embodiment, first driver A 106 is a solenoid current driver and second driver A 108 is a torque motor current driver. As such, deficiencies in first driver A 106 are not repeated in the second driver A 108 because first driver A 106 and second driver A 108 are different types of drivers. In an alternative embodiment, first driver A 106 is a first suitable type of driver, and second driver A 108 is a second suitable type of driver that is different than the first type of driver such that each driver A 106 and 108 is controlled using different logic and/or outputs.

In the exemplary embodiment, second driver control system 104 includes a first driver B 110 and a second driver B 112. In an alternative embodiment, second driver control system 104 is coupled to first driver B 110 and second driver B 112. Second driver control system 104 is programmed with software that includes the first logic algorithm and the second logic algorithm. More specifically, in the exemplary embodiment, first driver B 110 is a solenoid current driver and second driver B 112 is a torque motor current driver. As such, deficiencies in first driver B 110 are not repeated in the second driver B 112 because first driver B 110 and second driver B 112 are different types of drivers. In an alternative embodiment, first driver B 110 is a first suitable type of driver, and second driver B 112 is a second suitable type of driver that is different than the first type of driver such that each driver B 110 and 112 is controlled by different logic and/or outputs. In the exemplary embodiment, first driver A 106 and first driver B 110 are the same type of driver, and second driver A 108 and second driver B 112 are the same type of driver.

In the exemplary embodiment, engine 10 includes a sensor system, such as a sensor system 114 that senses an over-speed condition within engine 10. More specifically, sensor system 114 includes at least one speed sensor that measures a rotational speed of either first rotor shaft 24 (shown in FIG. 1) and/or second rotor shaft 26 (shown in FIG. 1). As such, sensor system 114 outputs the rotational speed of rotor shaft 24 and/or rotor shaft 26 as an electric speed signal. Specifically, the electronic speed signal is transmitted from sensor system 114 to control system 100, which includes logic to determine if the speed signal is indicative of an over-speed condition. More specifically, the speed signal is transmitted to first driver control system 102 and second driver control system 104, such that first driver A 106, second driver A 108, first driver B 110, and second driver B 112 each receive the transmitted speed signal to determine whether an over-speed condition exists.

First driver control system 102 is coupled to first fuel system interface 56 and second fuel system interface 58, and second driver control system 104 is coupled to first fuel system interface 56 and second fuel system interface 58 for transmitting an over-speed signal thereto. More specifically, each driver control system 102 and 104 must independently determine that an over-speed condition exists for an over-speed signal to be transmitted to either first fuel system interface 56 and/or second fuel system interface 58. In the exemplary embodiment, first driver A 106 is communicatively coupled to first fuel system interface 56, second driver A 108 is communicatively coupled to second fuel system interface 58, first driver B 110 is communicatively coupled to first fuel system interface 56, and second driver B 112 is communicatively coupled to second fuel system interface 58. As such, first drivers 106 and 110 are coupled to first fuel system interface 56, and second drivers 108 and 112 are coupled to second fuel system interface 58. More specifically, in the exemplary embodiment, solenoid current drivers are coupled to first fuel system interface 56, and torque motor current drivers are coupled to second fuel system interface 58.

When the speed signal transmitted from sensor system 114 is indicative of an over-speed condition, each driver 106, 108, 110, and 112 transmits an over-speed signal to a respective fuel system interface 56 or 58. More specifically, in the exemplary embodiment, both first drivers 106 and 110 transmit an over-speed signal to first fuel system interface 56 to open shuttle valve 74, and both second drivers 108 and 112 transmit an over-speed signal to second fuel system interface 58 to open shuttle valve 80. If the speed signal is not indicative of an over-speed condition, a deficiency in first drivers 106 and 110 or in second drivers 108 and 112 may cause an over-speed signal to be transmitted to a respective fuel system interface 56 or 58. However, such a driver operational transient signal will not prevent fuel from flowing to combustor 16 because both fuel system interfaces 56 and 58 must receive an over-speed signal before fuel is prevented from flowing to combustor 16. As such, the non-symmetry of first drivers 106 and 110 and second drivers 108 and 112 provides an additional safety redundancy before fuel is prevented from flowing to combustor 16.

Figure 5:
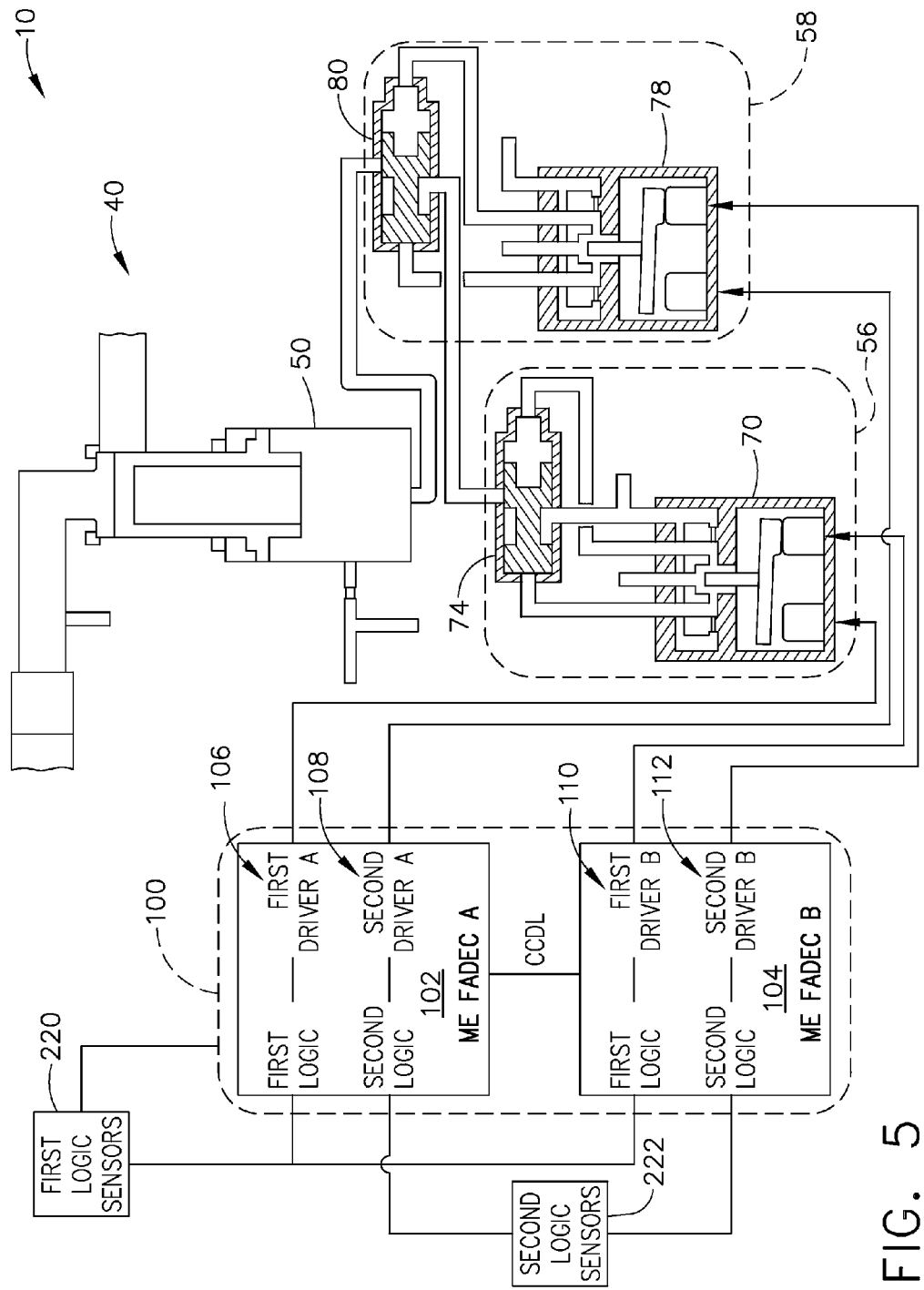
FIG. 5 is a schematic illustration of the control system shown in FIG. 4 and coupled to a plurality of independent over-speed sensors.

FIG. 5 is a schematic illustration of control system 100 coupled to a plurality of independent over-speed sensors 220 and 222. As described above, control system 100 includes first driver control system 102 and second driver control system 104.

In the exemplary embodiment, first driver control system 102 includes first driver A 106 and second driver A 108 and is programmed with software that includes a first logic algorithm and a second logic algorithm. Moreover, in the exemplary embodiment, first driver A 106 is controlled according to an output of the first logic algorithm and second driver A 108 is controlled according to an output of the second logic algorithm.

Similarly, in the exemplary embodiment, second driver control system 104 is coupled to first driver B 110 and second driver B 112 and is programmed with software that includes the first logic algorithm and the second logic algorithm. In the exemplary embodiment, first driver B 110 is controlled according to an output of the first logic algorithm and second driver B 112 is controlled according to an output of the second logic algorithm.

In the exemplary embodiment, the first logic algorithm uses, for example, different methodologies, calculations, and/or over-speed thresholds than the second logic algorithm to determine the occurrence of an over-speed condition. In one embodiment, first logic algorithm and second logic algorithm are developed such that deficiencies, for example software defects, included in either logic algorithm are not included in the other logic algorithm. Moreover, two independent logic algorithms facilitate reducing the risk that a single, common software fault may inadvertently cause over-speed protection system 40 to unnecessarily stop fuel flow to combustor 16.

Additionally, in the exemplary embodiment, first driver control system 102 is coupled to a first set of over-speed sensors 220 and to a second set of over-speed sensors 222. Over-speed sensors 220 are separate, and function independently from over-speed sensors 222. Moreover, over-speed sensors 220 and 222 are positioned within engine 10 to measure engine operating parameters and to provide first and second driver control systems 102 and 104 with engine operating information. In the exemplary embodiment, first driver control system 102 controls operation of first driver A 106, and uses the first logic algorithm to identify a rotor over-speed condition. First driver control system 102 executes the first logic algorithm to identify a rotor over-speed condition and controls operation of first driver A 106 accordingly. The first logic algorithm determines the desired operation of first driver A 106 based on engine operating measurements provided by first set of logic sensors 220.

In the exemplary embodiment, first driver control system 102 controls a state of second driver A 108 by executing the second logic algorithm, and bases a determination of the occurrence of a rotor over-speed condition and desired operation of second driver A 108 on engine operating measurements provided by second logic sensors 222.

Similarly, second driver control system 104 is coupled to over-speed sensors 220 and to over-speed sensors 222. In the exemplary embodiment, second driver control system 104 controls operation of first driver B 110 and uses the first logic algorithm to identify an over-speed condition. Second driver control system 104 executes the first logic algorithm to identify a rotor over-speed condition, and controls operation of first driver B 110 accordingly. The first logic algorithm uses engine operating information provided from first set of logic sensors 220 to determine the desired operation of first driver B 110.

In the exemplary embodiment, second driver control system 104 controls a state of second driver B 112 by executing the second logic algorithm, and bases a determination of the occurrence of an over-speed condition and the desired operation of second driver B 112 on engine operating measurements provided by second logic sensors 222.

In the exemplary embodiment, before first driver control system 102 can signal an over-speed condition that would cause over-speed protection system 40 to stop fuel flow to combustor 16, the first logic algorithm must determine that an over-speed condition is occurring based on engine operating information provided by first set of logic sensors 220, and the second logic algorithm must also determine that an over-speed condition is occurring based on engine operating information provided by second set of logic sensors 222. Moreover, first driver control system 102 cannot cause over-speed protection system 40 to stop fuel flow without second driver control system 104 also signaling the occurrence of an over-speed condition. However, for second driver control system 104 to signal an over-speed condition, the first logic algorithm must determine that an over-speed condition is occurring based on engine operating information provided by first set of logic sensors 220, and the second logic algorithm must also determine that an over-speed condition is occurring based on engine operating information provided by second set of logic sensors 222.

As described above, logic sensors 220 are separate, and operate independently from logic sensors 222. By independently measuring engine operating parameters, false over-speed determinations caused by, for example, a malfunctioning sensor, are facilitated to be reduced. Furthermore, by analyzing the engine operating information provided by logic sensors 220 and 222, in two separate driver control systems 102 and 104, false over-speed determinations caused by, for example, a malfunctioning driver control system, are facilitated to be reduced. Moreover, by programming each of first driver control system 102 and second driver control system 104 with two independent logic algorithms, false over-speed determinations caused by, for example, a single software fault, are facilitated to be reduced.

The rotor over-speed protection system as described above includes an integrated throttling/shutoff system. The systems and methods described herein are not limited to a combined throttling/shutoff system, but rather, the systems and methods may be implemented as a separate shutoff system, distinct from the fuel metering and throttling functions. Further, the specific embodiments may be implemented into a bypass type of fuel metering system, as well as into a direct injection type of system that does not include a separate metering/throttling function.

The above-described rotor over-speed protection system is highly fault-tolerant and robust. The rotor over-speed protection system facilitates a rapid fuel shutoff to prevent damage to an engine caused by a rotor over-speed. Additionally, the above-described rotor over-speed protection system addresses a number of potential causes of false over-speed determinations to facilitate preventing unnecessary, and potentially costly, fuel shutoffs due to false over-speed determinations. The above-described rotor over-speed protection system facilitates preventing common deficiencies, for example, common design deficiencies and/or common component failure deficiencies, from causing an unnecessary fuel shutoff due to a false over-speed determination. As a result, the rotor over-speed protection system prevents rotor over-speeds in a cost-effective and reliable manner.

The above-described rotor over-speed protection system includes a first fuel system interface and a second fuel system interface that provide redundant over-speed protection to, for example, an engine that includes a first form of over-speed protection, such as, a fuel metering system. By requiring an over-speed determination be made by both fuel system interfaces before fuel flow to the engine is discontinued, the above-described rotor over-speed protection system facilitates reducing the probability of a false determination of an over-speed condition.

Further, the above-described rotor over-speed protection system includes a current driver system that has an asymmetric driver configuration that facilitates reducing the impact of a deficiency within a driver of the current driver system. More specifically, the current driver system includes first and second solenoid current drivers that are coupled to a first fuel system interface, and first and second torque motor current drivers that are coupled to a second fuel interface. As such, a false positive initiated by either one of the drivers will not prevent fuel from flowing to a combustor. Accordingly, the asymmetric driver configuration of the current driver system facilitates preventing inadvertent engine shut-downs. By selectively adding asymmetric features into the current driver system at certain critical locations, the possibility of introducing common design deficiencies is facilitated to be reduced because operation of a solenoid driver in one channel and a torque motor driver in the other channel will be required prior to the engine being shut down and therefore, such a design substantially prevents a common design flaw from inadvertently shutting down the engine.

Further, the above-described rotor includes a first driver control system and a second driver control system that are each coupled to a plurality of independent over-speed sensors. Each driver control system includes at least a first logic algorithm and a second logic algorithm. Two independent logic algorithms facilitate reducing the risk that a single, common software fault may inadvertently cause the over-speed protection system to unnecessarily stop fuel flow to the engine.

Exemplary embodiments of systems and method for controlling combustion within a gas turbine engine are described above in detail. The systems and method are not limited to the specific embodiments described herein, but rather, components of systems and/or steps of the method may be utilized independently and separately from other components and/or steps described herein. For example, the systems and method may also be used in combination with other combustion systems and methods, and are not limited to practice with only the gas turbine engine as described herein. Rather, the exemplary embodiment can be implemented and utilized in connection with many other control applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for assembling a gas turbine engine, said method comprising:
    coupling a first fuel system interface (FSI-1) to a second fuel system interface (FSI-2);
    coupling one of the FSI-1 and the FSI-2 to the gas turbine engine;
    coupling a first control system to the FSI-1 and to the FSI-2, wherein the first control system includes a first driver A and a second driver A;
    coupling a second control system to the FSI-1 and to the FSI-2, wherein the second control system includes a first driver B and a second driver B;
    configuring the first control system to apply a first over-speed logic algorithm to determine operation of at least one of the first driver A, the second driver A, the first driver B, and the second driver B, and to apply a second over-speed logic algorithm to determine operation of at least one of the first driver A, the second driver A, the first driver B, and the second driver B, wherein the first over-speed logic algorithm applies different methodologies, calculations, and over-speed thresholds than the second over-speed logic algorithm; and
    configuring the second control system to apply the first over-speed logic algorithm to determine operation of at least one of the first driver A, the second driver A, the first driver B, and the second driver B, and to apply the second over-speed logic algorithm to determine operation of at least one of the first driver A, the second driver A, the first driver B, and the second driver B.

2. A method in accordance with claim 1, wherein configuring the first control system comprises configuring the first control system to apply the first over-speed logic algorithm to determine operation of the first driver A and to apply the second over-speed logic algorithm to determine operation of the second driver A.

3. A method in accordance with claim 1, wherein configuring the second control system comprises configuring the second control system to apply the first over-speed logic algorithm to determine operation of the first driver B and to apply the second over-speed logic algorithm to determine operation of the second driver B.

4. A method in accordance with claim 1, wherein coupling one of the FSI-1 and the FSI-2 to the gas turbine engine comprises coupling one of the FSI-1 and the FSI-2 to a fuel throttling/shutoff valve configured to discontinue fuel flow to a combustor of the gas turbine engine upon receipt of an over-speed signal from the FSI-1 and the FSI-2.

5. A method in accordance with claim 1, further comprising configuring a first set of logic sensors to collect operating information from the engine, and a second set of logic sensors that are independent from the first set of logic sensors, to collect operating information from the engine.

6. A method in accordance with claim 5, further comprising configuring the first control system to receive engine operating information from at least one of the first set of logic sensors and the second set of logic sensors, and configuring the second control system to receive engine operating information from at least one of the first set of logic sensors and the second set of logic sensors.

7. A method in accordance with claim 1, further comprising configuring the first over-speed logic algorithm to apply at least one of a first over-speed threshold and a first set of over-speed calculations, to determine operation of at least one of the first driver A, the second driver A, the first driver B, and the second driver B.

8. A method in accordance with claim 1, further comprising configuring the second over-speed logic algorithm to apply at least one of a second over-speed threshold and a second set of over-speed calculations, to determine operation of at least one of the first driver A, the second driver A, the first driver B, and the second driver B.

9. A method in accordance with claim 1, wherein said first driver A is a different type of driver than said second driver A and said first driver B is a different type of driver than said second driver B, where the type of driver is defined by at least one of logic and outputs.

10. An over-speed protection system for a gas turbine engine including a rotor, said over-speed protection system comprising:
a fuel throttling/shutoff valve coupled to a fuel supply coupled to said gas turbine engine;
a first fuel system interface (FSI-1) coupled to said fuel throttling/shutoff valve;
a second fuel system interface (FSI-2) coupled to said FSI-1;
a first control system coupled to said FSI-1 and to said FSI-2, said first control system comprising a first driver A and a second driver A, said first control system programmed with a first logic algorithm and a second logic algorithm, wherein the first logic algorithm applies different methodologies, calculations, and over-speed thresholds than the second logic algorithm; and
a second control system coupled to said FSI-1 and said FSI-2, said second control system comprising a first driver B and a second driver B, said second control system programmed with the first logic algorithm and the second logic algorithm.

11. A system in accordance with claim 10, wherein said fuel throttling/shutoff valve is configured to discontinue fuel flow to said gas turbine engine upon receipt of an over-speed signal from said FSI-1 and said FSI-2.

12. A system in accordance with claim 10, wherein said first control system is configured to determine operation of said first driver A using the first logic algorithm, and to determine operation of said second driver A using the second logic algorithm.

13. A system in accordance with claim 10, wherein said second control system is configured to determine operation of said first driver B using the first logic algorithm, and to determine operation of said second driver B using the second logic algorithm.

14. A system in accordance with claim 10, wherein said FSI-1 comprises a servovalve coupled to a shutoff shuttle valve.

15. A system in accordance with claim 14, wherein said servovalve comprises an electro-hydraulic servovalve (EHSV).

16. A system in accordance with claim 10, wherein said FSI-2 comprises a servovalve coupled to a shutoff shuttle valve.

17. A system in accordance with claim 16, wherein said servovalve comprises an electro-hydraulic servovalve (EHSV).

18. A system in accordance with claim 10, wherein said first driver A is a different type of driver than said second driver A and said first driver B is a different type of driver than said second driver B, where the type of driver is defined by at least one of logic and outputs.

19. A gas turbine engine comprising:
a rotor;
a fuel delivery system configured to supply fuel to said engine for operating said rotor;
an over-speed protection system coupled to said fuel delivery system, said over-speed protection system comprising:
a fuel throttling/shutoff valve coupled to said fuel delivery system;
a first fuel system interface (FSI-1) coupled to said fuel throttling/shutoff valve;
a second fuel system interface (FSI-2) coupled to said FSI-1;
a first control system coupled to said FSI-1 and to said FSI-2, said first control system comprising a first driver A and a second driver A, said first control system programmed with a first logic algorithm and a second logic algorithm, wherein the first logic algorithm applies different methodologies, calculations, and over-speed thresholds than the second logic algorithm; and
a second control system coupled to said FSI-1 and said FSI-2, said second control system comprising a first driver B and a second driver B, said second control system programmed with the first logic algorithm and the second logic algorithm.

20. An engine in accordance with claim 19, wherein said fuel throttling/shutoff valve is configured to discontinue fuel flow to said gas turbine engine upon receipt of an over-speed signal from said FSI-1 and said FSI-2.

21. An engine in accordance with claim 19, said first control system configured to determine operation of said first driver A using the first logic algorithm, and to determine operation of said second driver A using the second logic algorithm.

22. An engine in accordance with claim 19, said second control system configured to determine operation of said first driver B using the first logic algorithm, and to determine operation of said second driver B using the second logic algorithm.

23. An engine in accordance with claim 19, wherein said first driver A is a different type of driver than said second driver A and said first driver B is a different type of driver than said second driver B, where the type of driver is defined by at least one of logic and outputs.

* * * * *